US008561701B2

(12) United States Patent
Patil et al.

(10) Patent No.: US 8,561,701 B2
(45) Date of Patent: Oct. 22, 2013

(54) METHODS FOR CEMENTING IN A SUBTERRANEAN FORMATION USING A CEMENT COMPOSITION CONTAINING CALCIUM SILICATE HYDRATE SEEDS

(75) Inventors: Rahul Patil, Maharashtra (IN); Trissa Joseph, Maharashtra (IN); Abhimanyu Deshpande, Maharashtra (IN); Vineet Sathe, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 181 days.

(21) Appl. No.: 13/181,303

(22) Filed: Jul. 12, 2011

(65) Prior Publication Data

US 2012/0152540 A1    Jun. 21, 2012

Related U.S. Application Data

(60) Provisional application No. 61/425,535, filed on Dec. 21, 2010.

(51) Int. Cl.
  *E21B 33/13* (2006.01)
(52) U.S. Cl.
  USPC .......................................... 166/293
(58) Field of Classification Search
  None
  See application file for complete search history.

(56) References Cited

U.S. PATENT DOCUMENTS

| | | | | |
|---|---|---|---|---|
| 4,883,125 A * | 11/1989 | Wilson et al. | | 166/291 |
| 5,820,670 A * | 10/1998 | Chatterji et al. | | 106/737 |
| 7,041,167 B2 | 5/2006 | Jiang | | |
| 7,086,466 B2 * | 8/2006 | Roddy | | 166/280.1 |
| 7,174,962 B1 * | 2/2007 | Roddy et al. | | 166/293 |
| 7,213,646 B2 * | 5/2007 | Roddy et al. | | 166/285 |
| 7,341,104 B2 * | 3/2008 | Roddy | | 166/280.2 |
| 7,424,913 B2 | 9/2008 | Roddy | | |
| 7,559,369 B2 | 7/2009 | Roddy | | |
| 2009/0260544 A1 | 10/2009 | Roddy | | |
| 2010/0016183 A1 | 1/2010 | Roddy | | |
| 2011/0132605 A1 * | 6/2011 | Sarap et al. | | 166/293 |

FOREIGN PATENT DOCUMENTS

WO    2011029711 A1    3/2011

OTHER PUBLICATIONS

Thomas, et al, Influence of Nucleation Seeding on the Hydration Mechanisms of Tricalcium Silicate and Cement, J. Phys. Chem., 2009, 113, 4327-34.
Alizedeh, et al, Hydration of tricalcium silicate in the presence of synthetic calcium-silicate-hydrate, Journal of Materials Chemistry, 2009, 19, 7937-46.

* cited by examiner

*Primary Examiner* — Shane Bomar
*Assistant Examiner* — Silvana Runyan
(74) *Attorney, Agent, or Firm* — Craig W. Roddy; Sheri Higgins Law; Sheri Higgins (57) ABSTRACT

According to an embodiment, a method of cementing in a subterranean formation comprises: introducing a cement composition into the subterranean formation, wherein the cement composition comprises: cement; water; and calcium silicate hydrate (C-S-H) seeds, wherein a test cement composition consisting essentially of: the cement; the water; and the C-S-H seeds, and in the same proportions as in the cement composition, develops a compressive strength of at least 1,200 psi (8.3 MPa) when tested at 24 hours, a temperature of 60° F. (15.6° C.), and a pressure of 3,000 psi (20.7 MPa); and allowing the cement composition to set. According to another embodiment, the C-S-H seeds are mesoscopic particles, nanoparticles, or combinations thereof, and wherein the C-S-H seeds are in a concentration in the range of about 1% to about 5% by weight of the cement.

20 Claims, 1 Drawing Sheet

METHODS FOR CEMENTING IN A SUBTERRANEAN FORMATION USING A CEMENT COMPOSITION CONTAINING CALCIUM SILICATE HYDRATE SEEDS

CROSS-REFERENCE TO RELATED APPLICATIONS

This application claims the benefit of U.S. Provisional Application No. 61/425,535, filed Dec. 21, 2010.

TECHNICAL FIELD

Methods of cementing in a subterranean formation are provided. The cement compositions for use in the subterranean formation include mesoscopic particles, nanoparticles, or combinations thereof of calcium silicate hydrate (C-S-H) seeds. In an embodiment, the cement composition also includes a latex additive. In another embodiment, the subterranean formation is penetrated by a well.

SUMMARY

According to an embodiment, a method of cementing in a subterranean formation comprises: introducing a cement composition into the subterranean formation, wherein the cement composition comprises: cement; water; and calcium silicate hydrate (C-S-H) seeds, wherein a test cement composition consisting essentially of: the cement; the water; and the C-S-H seeds, and in the same proportions as in the cement composition, develops a compressive strength of at least 1,200 psi (8.3 MPa) when tested at 24 hours, a temperature of 60° F. (15.6° C.), and a pressure of 3,000 psi (20.7 MPa); and allowing the cement composition to set.

According to another embodiment, a method of cementing in a subterranean formation comprises: introducing a cement composition into the subterranean formation, wherein the cement composition comprises: cement; water; and calcium silicate hydrate (C-S-H) seeds, wherein the C-S-H seeds are in at least a sufficient concentration such that the cement composition develops a compressive strength of at least 1,200 psi (8.3 MPa) when tested at 24 hours, a temperature of 60° F. (15.6° C.), and a pressure of 3,000 psi (20.7 MPa), whereas a substantially identical cement composition without the C-S-H seeds, develops a compressive strength of less than 1,200 psi (8.3 MPa) when tested at 24 hours, a temperature of 60° F. (15.6° C.), and a pressure of 3,000 psi (20.7 MPa); and allowing the cement composition to set.

According to another embodiment, a method of cementing in a subterranean formation comprises: introducing a cement composition into the subterranean formation, wherein the cement composition comprises: cement; water; and calcium silicate hydrate (C-S-H) seeds, wherein the C-S-H seeds are mesoscopic particles, nanoparticles, or combinations thereof, and wherein the C-S-H seeds are in a concentration in the range of about 1% to about 5% by weight of the cement; and allowing the cement composition to set.

BRIEF DESCRIPTION OF THE FIGURE

The features and advantages of certain embodiments will be more readily appreciated when considered in conjunction with the accompanying figure. The figure is not to be construed as limiting any of the preferred embodiments.

DETAILED DESCRIPTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a test cement composition can consist essentially of cement, water, and C-S-H seeds. The test cement composition can include other ingredients so long as the presence of the other ingredients do not materially affect the basic and novel characteristics of the claimed invention.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase, whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

As used herein, a "cement composition" is a mixture of at least cement and water. A cement composition can include additives. As used herein, the term "cement" means an initially dry substance that, in the presence of water, acts as a binder to bind other materials together. An example of cement is Portland cement. A cement composition is generally a slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, squeeze cementing, or gravel packing operations.

Cement generally contains four main types of minerals. Cement can also include other minerals in addition to the four main types. The minerals in cement are commonly referred to as the phases of the cement. The four main phases of cement are called alite, belite, aluminate, and ferrite.

"Alite" is a name for tricalcium silicate and "belite" is a name for dicalcium silicate. Cement chemist often abbreviate alite as $C_3S$ and belite as $C_2S$. Both, alite and belite have different compositions compared to pure tricalcium silicate and dicalcium silicate because each one contains minor amounts of other oxides besides calcium oxide (CaO) and silicon dioxide ($SiO_2$).

"Aluminate" is a name for tricalcium aluminate, abbreviated by cement chemists as $C_3A$. Aluminate has a different composition compared to pure tricalcium aluminate because it contains minor amounts of other oxides besides CaO and aluminum oxide ($Al_2O_3$). "Ferrite" is a name for tetracalcium aluminoferrite, abbreviated by cement chemists as $C_4AF$. Ferrite has a different composition compared to pure tetracalcium aluminoferrite because it contains minor amounts of other oxides besides CaO, $Al_2O_3$, and iron oxide ($Fe_2O_3$).

When cement is mixed with water, the various phases of the cement can undergo a hydration reaction and form hydration products. The silicate phases (alite and belite) form hydration products of at least calcium silicate hydrate and calcium hydroxide (abbreviated by cement chemists as CH). Calcium silicate hydrate is often abbreviated as C-S-H. The dashes indicate there is no strict ratio of CaO to $SiO_2$ inferred. The aluminate and ferrite phases can form a variety of hydration products, including, hydrogarnet, ettringite, and monosulfoaluminate, depending on the amount of gypsum present in the cement.

Soon after mixing cement with water, aluminate reacts very quickly with the water to form an aluminate-rich gel. This reaction is highly exothermic, but generally lasts for only a few minutes after mixing. This stage in the hydration reaction is normally followed by a few hours of relatively low heat evolution, sometimes called the dormant stage. The dormant stage is when a cement composition can be placed in the location to be cemented. Eventually, the cement composition becomes too viscous to place in the desired location. At the end of the dormant stage, the alite and belite start to react with the water to form their hydration products. The hydration products occupy a larger volume in the cement composition compared to the solid phases. Consequently, the cement composition is converted from a viscous slurry into a rigid solid material. C-S-H can represent up to 70% by volume of the cement composition matrix and is primarily what gives the cement composition its mechanical properties, such as compressive strength.

Each phase of the cement generally reacts at a different rate to form their hydration products. Some of the factors that can influence the reaction rate of the various phases of the cement and water include: the type of the reactant; the physical state of the reactants; the concentration of the reactants in relation to each other; and temperature. The four main phases of cement have the following order of reaction rates based solely on the type of the reactant: aluminate ($C_3A$)>alite ($C_3S$)>belite ($C_2S$) and ferrite ($C_4AF$). For example, alite hydrates and hardens rapidly and is responsible for the initial setting and early compressive strength of a cement composition. By contrast, belite hydrates and hardens more slowly and contributes to the development of compressive strength of the cement composition at a later time (normally beyond 7 days after mixing).

The physical state of the reactants can also affect the reaction rate. When the reactants are in different phases, i.e., a solid, liquid, or gas, then the reaction rate is limited to the interface between the reactants. For example, alite is a solid, and when mixed with liquid water, the surface area of the alite plays a role in the reaction rate between the alite and the water. By increasing the surface area of a solid, such as alite, in a liquid phase, the reaction rate can be increased.

The concentration of reactants and temperature can also affect the reaction rate. Generally, as the concentration of one of the reactants increases, the reaction rate also increases. Moreover, as temperature increases, the reaction rate generally increases. However, there is usually a maximum increase in the reaction rate, such that, at some point, the reaction rate no longer increases even though the concentration of a reactant or the temperature is being increased.

Solid particles can broadly be described as falling within the following size ranges: bulk particles; mesoscopic particles; and nanoparticles. As used herein, a "bulk particle" is a particle having a particle size of greater than 1 micrometer (1 μm or 1 micron). As used herein, a "mesoscopic particle" is a particle having a particle size in the range of 1 micron to 0.1 micron. As used herein, a "nanoparticle" is a particle having a particle size of less than 0.1 micron. As used herein, the term "particle size" refers to the volume surface mean diameter ("$D_s$"), which is related to the specific surface area of the particle. The volume surface mean diameter may be defined by the following equation: $D_s = 6/(\Phi_s A_w \rho_p)$, where $\Phi_s$=sphericity; $A_w$=specific surface area; and $\rho_p$=particle density. Due to their small size, the manufacture of nanoparticles can be quite costly. By contrast, mesoscopic particles can cost less to manufacture. In order to reduce the cost associated with cementing operations, additives that are mesoscopic particles may be preferred over nanoparticles.

The size of a particle can influence the particle's physical properties. For example, as the size of a system of particles decreases below the size of bulk particles, the more changes in the particle's physical properties can occur. This is known as the quantum size effect. The quantum size effect means that the physical properties of solids changes with greater reductions in particle size. The quantum size effect becomes dominant in nanoparticles; however, the quantum size effect can also be observed with mesoscopic particles as well. The quantum size effect is normally not observed for bulk particles. One example of a change in physical properties is an increase in the surface area to volume ratio of the particles. This increase in the surface area to volume ratio creates a higher surface energy for the particles. This higher surface energy means that more contact is made between the particles and a reactant, resulting in a higher rate of reaction between the particles and the reactant. For a cement composition, a higher surface energy enables the phases of the cement to react at a faster rate, thereby enhancing some of the physical properties of the cement composition, for example, thickening time or compressive strength.

During cementing operations, it is desirable for the cement composition to remain pumpable during introduction into the subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes. A cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., thickening time or compressive strength) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). After the cement composition is ramped up to the specified temperature and possibly specified pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. The non-destructive compressive strength method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) at a specified temperature and pressure. As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

In order to help enhance some of the physical or mechanical properties of a cement composition, C-S-H seeds can be added to a cement composition. As used herein, "C-S-H seeds" means solid particles of C-S-H and does not include any C-S-H formed from the hydration reaction of any of the phases of the cement and the water in the cement composition. By adding C-S-H seeds to a cement composition, the C-S-H seeds provide extra nuclei to the phases of the cement, thereby increasing the hydration reaction rates of the phases. By increasing the hydration reaction rates, some of the properties of the cement composition can be enhanced. For example, the initial setting time and setting time of a cement composition containing C-S-H seeds can be decreased.

One of the purposes of a cementing operation can be to isolate a portion of a wellbore and prevent the flow of fluids through the cement composition into other areas of the wellbore. An example of fluid flow through a cement composition is called gas migration. Gas migration is caused by a loss in hydrostatic pressure at some time before the cement composition has achieved a high enough static gel strength to resist gas flow through the cement composition.

Static gel strength is the development of rigidity within the matrix of a cement composition that causes the cement composition to resist a force placed upon it. A cement composition with a static gel strength of less than 100 lb/100 ft$^2$ is relatively fluid and can flow and transfer hydrostatic pressure. The static gel strength of a cement composition can be measured using a variety of testing equipment. The static gel strength of a cement composition is usually reported in units of weight per unit area, such as pounds per square feet (1b/ft$^2$).

As used herein, the "SGSA static gel strength" of a cement composition is measured as follows. The cement composition is mixed. The cement composition is then placed in a Static Gel Strength Analyzer (SGSA), such as a Chandler SGSA, and tested at a specified temperature and pressure. The SGSA continually measures the transit time of the acoustic signal through the sample. The SGSA device contains preset algorithms that correlate transit time to static gel strength.

As used herein, the "Mini MACS static gel strength" (Mini Multiple Analysis Cement System) of a cement composition is measured as follows. The cement composition is mixed. The cement composition is then placed into a Mini MACS Analyzer. The cement composition is heated to a specified temperature, and pressurized to a specified pressure and stirred at 150 revolutions per minute (rpm) until the anticipated placement time is reached. The paddle of the Mini MACS Analyzer is rotated at a speed of 0.2°/min and the shear resistance on the paddle is measured. The shear resistance on the paddle is then correlated to the static gel strength of the cement composition.

As used herein, the "zero gel time" is the difference in time between when a cement composition is mixed and when the cement composition reaches a static gel strength of 100 lb/100 ft$^2$. After reaching 100 lb/100 ft$^2$, a cement composition can continue to develop static gel strength. When the cement composition develops a static gel strength of at least 500 lb/100 ft$^2$, the cement composition generally no longer loses hydrostatic pressure, and as such, gas migration can either be greatly diminished or can cease altogether. As used herein, the "transition time" is the time it takes for the static gel strength of a cement composition to increase from 100 lb/100 ft$^2$ to 500 lb/100 ft$^2$. It is desirable to have as short a transition time as possible.

An additive can be included in a cement composition to help eliminate or control gas migration. An example, of such an additive is latex. Latex is a slurry consisting of solid rubber particles as the dispersed phase and a liquid as the continuous phase. Generally, water is the continuous phase of the slurry. Examples of suitable rubber particles, include natural rubber (cis-1,4-polyisoprene) in most of its modified types, and synthetic polymers of various types, including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, AMPS-styrene-butadiene rubber, and combinations thereof. "AMPS" refers to 2-acrylamido-2-methylpropanesulfonic acid or salts thereof. Examples of suitable latex additives can be found in: U.S. Pat. No. 5,293,938 issued to David D. Onan, Garland W. Davis, Roger S. Cromwell, and Wendell D. Riley on Mar. 15, 1994; U.S. Pat. No. 5,688,844 issued to Jiten Chatterji, Bobby J. King, Patty L. Totten, and David D. Onan on Nov. 18, 1997; and U.S. Pat. No. 7,784,542 B2 issued to Craig W. Roddy, Jiten Chatterji, Roger Cromwell, Rahul Chandrakant Patil, Abhijit Tarafdar, Abhimanyu Deshpande, and Christopher Lynn Gordon on Aug. 31, 2010, each of which is hereby incorporated by reference in its entirety for all purposes. It is common to include other additives in a cement composition containing a latex additive. For example, vulcanizing agents for the rubber and latex stabilizers can be added to the cement composition. Examples of suitable vulcanizing agents include, sulfur, organic peroxide compounds, azo compounds, phenolic curatives, benzoquinone derivatives, bismaleimides, selenium, tellurium, nitro compounds, resins, metal oxides, and organic sulfur compounds such as alkyl thiuram disulfides, which can be found in U.S. Pat. No. 5,293,938. Examples of suitable latex stabilizers include, ethoxylated nonylphenol containing in the range of 15 from about 15 to about 40 moles of ethylene oxide and the sodium salt of a sulfonated and ethoxylated compound having the formula $H(CH_2)_{12-15}$, which can be found in U.S. Pat. No. 5,688,844.

However, some additives used to accelerate the setting of a cement composition can adversely interact with a latex additive. As a result, cement compositions containing a latex additive and a set accelerator may have reduced compressive strength and may develop compressive strength or static gel strength more slowly. Moreover, cement compositions containing a latex additive may have reduced compressive strength and may develop compressive strength or static gel strength more slowly compared to a similar cement composition without the latex additive.

It has been discovered that a cement composition containing C-S-H seeds, wherein the C-S-H seeds are mesoscopic particles, nanoparticles, or a combination thereof, can be used in a subterranean formation. It has also been discovered that a cement composition containing C-S-H seeds, wherein the C-S-H seeds are mesoscopic particles, nanoparticles, or a combination thereof, can be used in cement compositions containing a latex additive. Some of the advantages of including the C-S-H seeds in a cement composition, is that the cement composition can: develop a higher compressive strength; have a shorter initial setting time and setting time; develop a higher static gel strength; and be compatible with cement additives commonly used in cementing operations, compared to a similar cement composition without the C-S-H seeds.

According to an embodiment, a method of cementing in a subterranean formation comprises: introducing a cement composition into the subterranean formation, wherein the cement composition comprises: cement; water; and calcium silicate hydrate (C-S-H) seeds, wherein a test cement composition consisting essentially of: the cement; the water; and the C-S-H seeds, and in the same proportions as in the cement composition, develops a compressive strength of at least 1,200 psi (8.3 MPa) when tested at 24 hours, a temperature of 60° F. (15.6° C.), and a pressure of 3,000 psi (20.7 MPa); and allowing the cement composition to set.

According to another embodiment, a method of cementing in a subterranean formation comprises: introducing a cement composition into the subterranean formation, wherein the cement composition comprises: cement; water; and calcium silicate hydrate (C-S-H) seeds, wherein the C-S-H seeds are in at least a sufficient concentration such that the cement composition develops a compressive strength of at least 1,200 psi (8.3 MPa) when tested at 24 hours, a temperature of 60° F. (15.6° C.), and a pressure of 3,000 psi (20.7 MPa), whereas a substantially identical cement composition without the C-S-H seeds, develops a compressive strength of less than 1,200 psi (8.3 MPa) when tested at 24 hours, a temperature of 60° F. (15.6° C.), and a pressure of 3,000 psi (20.7 MPa); and allowing the cement composition to set.

According to another embodiment, a method of cementing in a subterranean formation comprises: introducing a cement composition into the subterranean formation, wherein the cement composition comprises: cement; water; and calcium silicate hydrate (C-S-H) seeds, wherein the C-S-H seeds are mesoscopic particles, nanoparticles, or combinations thereof, and wherein the C-S-H seeds are in a concentration in the range of about 1% to about 5% by weight of the cement; and allowing the cement composition to set.

The discussion of preferred embodiments regarding the cement composition or any ingredient in the cement composition, is intended to apply to all of the method embodiments. The discussion of preferred embodiments regarding the cement composition or any ingredient in the cement composition, is intended to apply to the cement composition, including any additional additives that might be included in the cement composition. For example, if the cement composition includes a latex additive, then the discussion of preferred embodiments, is meant to apply to a cement composition without a latex additive and a cement composition including the latex additive. It is to be understood that for any preferred embodiment given for a physical/mechanical property of the cement composition (e.g., thickening time, setting time, or transition time), then the C-S-H seeds should be in at least a sufficient concentration and the particle size of the C-S-H seeds should be chosen such that the cement composition develops the preferred physical/mechanical property.

Any reference to the unit "gallons" means U.S. gallons. As used herein, the term "soluble" means that at least 1 part of the substance dissolves in 99 parts of the liquid at a temperature of 77° F. (25° C.) and a pressure of 1 atm (0.1 MPa). As used herein, the term "insoluble" means that less than 1 part of the substance dissolves in 99 parts of the liquid at a temperature of 77° F. (25° C.) and a pressure of 1 atm (0.1 MPa).

The cement composition includes cement. The cement can be a hydraulic cement. A variety of hydraulic cements may be utilized in accordance with the present invention, including, but not limited to, those comprising calcium, aluminum, silicon, oxygen, iron, and/or sulfur, which set and harden by a reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, API Specification for Materials and Testing for Well Cements, API Specification 10, Fifth Ed., Jul. 1, 1990. Preferably, the cement is Class G or Class H cement.

The cement composition includes water. The water can be selected from the group consisting of freshwater, brackish water, saltwater, and any combination thereof. The cement composition can further include a water-soluble salt. Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 35% by weight of the water (ww).

The cement composition includes calcium silicate hydrate (C-S-H) seeds. Preferably, the C-S-H seeds are insoluble in water. The C-S-H seeds can be synthetic or the product of a hydration reaction between alite or belite and water. The dashes (–) indicate that no particular ratio of calcium (C) to silicate (5) is intended. However, a common ratio of C:S in calcium silicate hydrate is 2:1. The ratio of C:S can be any ratio so long as the calcium silicate hydrate enables the cement composition to satisfy the preferred embodiments. Preferably, the ratio of C:S is in the range of 0.5:2 to 2.5:0.5.

In one embodiment, the C-S-H seeds are mesoscopic particles, nanoparticles, or combinations thereof. Preferably, the C-S-H seeds are mesoscopic particles. According to this preferred embodiment, the C-S-H seeds have a particle size distribution such that at least 90% of the C-S-H seeds have a particle size in the range of 1 micron to 0.1 microns. More preferably, the C-S-H seeds have a particle size distribution such that at least 90% of the C-S-H seeds have a particle size in the range of about 0.4 microns to 0.1 microns.

The C-S-H seeds can be in a dry form. The C-S-H seeds can also be in a slurry form, in which the C-S-H seeds are the dispersed phase and an aqueous liquid or a liquid hydrocarbon is the continuous phase of the slurry. A commercially available example of C-S-H seeds in a slurry form is X-SEED® 100, available from BASF in Trostberg, Germany.

In one embodiment, the C-S-H seeds are in a concentration of at least 0.05% by weight of the cement (bwc). It should be understood that the concentrations of the C-S-H seeds are provided based on the dry weight of the C-S-H seeds. If the C-S-H seeds are in a slurry form, then the slurry will have a particular active solid % of the C-S-H seeds. For example, in a slurry, the dry weight concentration of C-S-H seeds can be calculated based on the active solid content of the C-S-H seeds in the slurry. In another embodiment, the C-S-H seeds are in a concentration in the range of about 0.05% to about 7% bwc. In another embodiment, the C-S-H seeds are in a concentration in the range of about 1% to about 5% bwc. According to another embodiment, the C-S-H seeds are in at least a sufficient concentration such that the cement composition develops a compressive strength of at least 1,200 psi (8.3 MPa) when tested at 24 hours, a temperature of 60° F. (15.6° C.), and a pressure of 3,000 psi (20.7 MPa), whereas a substantially identical cement composition, without the C-S-H seeds, develops a compressive strength of less than 1,200 psi (8.3 MPa) when tested at 24 hours, a temperature of 60° F. (15.6° C.), and a pressure of 3,000 psi (20.7 MPa).

In one embodiment, the cement composition further comprises a latex additive. In an embodiment, the latex additive is a slurry containing solid rubber particles as the dispersed phase and a liquid as the continuous phase. Water can be the continuous phase of the slurry. Examples of suitable rubber particles, include natural rubber (cis-1,4-polyisoprene) in most of its modified types, and synthetic polymers of various types, including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber, polysulfide rubber, AMPS-styrene-butadiene rubber, and combinations thereof. "AMPS" refers to 2-acrylamido-2-methylpropanesulfonic acid or salts thereof. The cement composition can also include other additives in addition to the latex additive. For example, vulcanizing agents for the rubber and latex stabilizers can be added to the cement composition. Examples of suitable vulcanizing agents include, sulfur, organic peroxide compounds, azo compounds, phenolic curatives, benzoquinone derivatives, bismaleimides, selenium, tellurium, nitro compounds, resins, metal oxides, and organic sulfur compounds such as alkyl thiuram disulfides. Examples of suitable latex stabilizers include, ethoxylated nonylphenol containing in the range of from about 15 to about 40 moles of ethylene oxide and the sodium salt of a sulfonated and ethoxylated compound having the formula $H(CH_2)_{12-15}$. Examples of suitable latex additives, ingredients in the latex additive, and additional additives for a cement composition containing the latex additive, such as rubber vulcanization additives and latex stabilizer additives, can be found in U.S. Pat. Nos. 5,293,938, 5,688,844, and U.S. Pat. No. 7,784,542 B2 (listed above), which are hereby incorporated by reference in their entirety for all purposes. Suitable commercially-available examples of a latex additive include, but are not limited to, LATEX 2000™ latex additive and LATEX 3000™ latex additive, marketed by Halliburton Energy Services, Inc.

In an embodiment, the cement composition has a thickening time of at least 2 hours at a temperature of 60° F. (15.6° C.) and a pressure of 5,000 psi (34.5 MPa). In another embodiment, the cement composition has a thickening time in the range of about 4 to about 15 hours at a temperature of 60° F. (15.6° C.) and a pressure of 5,000 psi (34.5 MPa). Some of the variables that can affect the thickening time of the cement composition include the concentration of the C-S-H seeds, the concentration of any set retarder included in the cement composition, the concentration of any salt present in the cement composition, and the bottomhole temperature of the subterranean formation. As used herein, the term "bottomhole" refers to the portion of the subterranean formation to be cemented. In another embodiment, the cement composition has a thickening time of at least 3 hours at the bottomhole temperature and pressure of the subterranean formation.

In one embodiment, the cement composition has an initial setting time of less than 24 hours, more preferably less than 12 hours, at a temperature of 60° F. (15.6° C.) and a pressure of 3,000 psi (20.7 MPa). In another embodiment, the cement composition has an initial setting time of less than 24 hours, more preferably less than 12 hours, at the bottomhole temperature and pressure of the subterranean formation.

Preferably, the cement composition has a setting time of less than 48 hours at a temperature of 60° F. (15.6° C.). More preferably, the cement composition has a setting time of less than 24 hours at a temperature of 60° F. (15.6° C.). Most preferably, the cement composition has a setting time in the range of about 3 to about 24 hours at a temperature of 60° F. (15.6° C.). In another embodiment, the cement composition has a setting time of less than 24 hours, more preferably less than 12 hours, at the bottomhole temperature and pressure of the subterranean formation.

According to an embodiment, a test cement composition consisting essentially of: the cement; the water; and the C-S-H seeds, and in the same proportions as in the cement composition, develops a compressive strength of at least 1,200 psi (8.3 MPa) when tested at 24 hours, a temperature of 60° F. (15.6° C.), and a pressure of 3,000 psi (20.7 MPa). Preferably, the cement composition has a compressive strength of at least 500 psi (3.5 MPa) when tested at 24 hours, a temperature of 60° F. (15.6° C.), and a pressure of 3,000 psi (20.7 MPa). More preferably, the cement composition has a compressive strength in the range of about 1,000 to about 5,000 psi (about 3.5 to about 34.5 MPa) when tested at 24 hours, a temperature of 60° F. (15.6° C.), and a pressure of 3,000 psi (20.7 MPa). According to another embodiment, the cement composition has a compressive strength in the range of about 1,000 to about 5,000 psi (about 3.5 to about 34.5 MPa) at the bottomhole temperature and pressure of the subterranean formation.

Preferably, the cement composition has a transition time of less than 4 hours (hr), using the SGSA static gel strength procedure at a temperature of 155° F. (68.3° C.) and a pressure of 4,500 psi (31 MPa). In one embodiment, the C-S-H seeds are in at least a sufficient concentration such that the cement composition has a transition time of less than 4 hr, using the SGSA static gel strength procedure at a temperature of 155° F. (68.3° C.) and a pressure of 4,500 psi (31 MPa). More preferably, the cement composition has a transition time of less than 1 hr, using the SGSA static gel strength procedure at a temperature of 155° F. (68.3° C.) and a pressure of 4,500 psi (31 MPa). Most preferably, the cement composition has a transition time of less than 30 minutes (min), using the SGSA static gel strength procedure at a temperature of 155° F. (68.3° C.) and a pressure of 4,500 psi (31 MPa). In another embodiment, the cement composition has a transition time of less than 70 min at the bottomhole temperature and pressure of the subterranean formation.

Preferably, the cement composition has a transition time of less than 70 minutes (min), using the Mini MACS static gel strength procedure at a temperature of 60° F. (15.6° C.) and a pressure of 5,000 psi (34.5 MPa). In one embodiment, the C-S-H seeds are in at least a sufficient concentration such that the cement composition has a transition time of less than 70 minutes (min), using the Mini MACS static gel strength procedure at a temperature of 60° F. (15.6° C.) and a pressure of 5,000 psi (34.5 MPa). More preferably, the cement composition has a transition time of less than 50 min, using the Mini MACS static gel strength procedure at a temperature of 60° F. (15.6° C.) and a pressure of 5,000 psi (34.5 MPa). Most preferably, the cement composition has a transition time of less than 30 min, using the Mini MACS static gel strength procedure at a temperature of 60° F. (15.6° C.) and a pressure of 5,000 psi (34.5 MPa).

The cement composition can further include other additives. Examples of other additives include, but are not limited to, a filler, a fluid loss additive, a set retarder, a friction reducer, a strength-retrogression additive, a light-weight additive, a defoaming agent, a high-density additive, a mechanical property enhancing additive, a lost-circulation material, a filtration-control additive, a thixotropic additive, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwc).

The cement composition can include a fluid loss additive. Suitable examples of commercially-available fluid loss additives include, but are not limited to, and are marketed by Halliburton Energy Services, Inc. under the tradenames HALAD®-344, HALAD®-413, and HALAD®-300. Preferably, the fluid loss additive is in a concentration in the range of about 0.05% to about 10% bwc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. Preferably, the set retarder is in a concentration in the range of about 0.05% to about 10% bwc.

The cement composition can include a friction reducer. Suitable examples of commercially-available friction reducers include, but are not limited to, and are marketed by Halliburton Energy Services, Inc. under the tradenames CFR-2™, CFR-3™, CFR-5LE™, CFR-6™, and CFR-8™. Preferably, the friction reducer is in a concentration in the range of about 0.1% to about 10% bwc.

The cement composition can include a strength-retrogression additive. Suitable examples of commercially-available strength-retrogression additives include, but are not limited to, and are marketed by Halliburton Energy Services, Inc. under the tradenames SSA-1™ and SSA-2™. Preferably, the strength-retrogression additive is in a concentration in the range of about 5% to about 50% bwc.

The cement composition can include a light-weight additive. Suitable examples of commercially-available light-weight additives include, but are not limited to, and are marketed by Halliburton Energy Services, Inc. under the tradenames SPHERELITE® and LUBRA-BEADS® FINE; and available from 3M in St. Paul, Minn. under the tradenames HGS2000™, HGS3000™, HGS4000™, HGS5000™, HGS6000™, HGS10000™, and HGS18000™ glass bubbles. Preferably, the light-weight additive is in a concentration in the range of about 5% to about 50% bwc.

Commercially-available examples of other additives include, but are not limited to, and are marketed by Halliburton Energy Services, Inc. under the tradenames High Dense® No. 3, High Dense No. 4, Barite™, Micromax™, Silicalite™, WellLife® 665, WellLife® 809, WellLife® 810, and Channel Seal™ Fluid.

In one embodiment, the cement composition has a density of at least 8 pounds per gallon (ppg) (0.96 kilograms per liter (kg/l)). In another embodiment, the cement composition has a density of at least 15 ppg (1.8 kg/l). In another embodiment, the cement composition has a density in the range of about 8 to about 15 ppg (about 0.96 to about 1.8 kg/l). In another embodiment, the cement composition has a density in the range of about 15 to about 20 ppg (about 1.8 to about 2.4 kg/l).

According to certain embodiments, a method of cementing in a subterranean formation comprises: introducing a cement composition into the subterranean formation, wherein the cement composition comprises: cement; water; and C-S-H seeds; and allowing the cement composition to set.

The method embodiments include the step of introducing the cement composition into a subterranean formation. The step of introducing is for the purpose of at least one of the following: well completion; foam cementing; primary or secondary cementing operations; well-plugging; squeeze cementing; and gravel packing. The cement composition can be in a pumpable state before and during introduction into the subterranean formation. In one embodiment, the subterranean formation is penetrated by a well. The well can be, without limitation, an oil, gas, water, or injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments can further comprise the step of forming the cement composition prior to the step of introducing. According to this embodiment, the step of forming can comprise: adding at least the cement, the water, and the C-S-H seeds to a mixing apparatus; and mixing the cement composition. The step of forming can further include adding at least one additive to form the cement composition. For example, a latex additive can be included to form the cement composition. The step of adding can be performed in any order. For example, the C-S-H seeds can be added to the cement and then the water can be added to the cement and C-S-H seeds. By way of another example, the water can be added to the cement and then the C-S-H seeds can be added to the water and the cement. By way of another example, the C-S-H seeds and the cement can be added to the water at the same time. Regardless of the sequence of adding, it is to be understood that the C-S-H seeds added to the cement composition are in addition to any C-S-H formed from the hydration reaction between any of the phases of the cement and the water. If any other additives, such as a latex additive, are to be included in the cement composition, then the other additive(s) can be added to the cement composition in any order. The step of mixing can be performed using a suitable mixing apparatus.

The method embodiments can further include the step of determining the maximum PVF (Packing Volume Fraction) prior to the step of introducing. If the method embodiments further include the step of forming the cement composition, then the step of determining the maximum PVF is performed prior to the step of forming. The term "packing volume fraction" refers to the volume of the solid particulate materials in a fluid divided by the total volume of the fluid. The size ranges of the preferred solid particulate materials are selected, as well as their respective proportions, in order to provide a maximum (or close as possible to maximum) packing volume fraction so that the fluid is in a hindered settling state. In order to obtain the maximum PVF, a combination of the following three features can be used. The first is the use of at least three particulate materials wherein the at least three particulate materials are in size ranges "disjointed" from one another. The second feature is the choice of the proportions of the three particulate materials in relation to the mixing, such that the fluid, when mixed, is in a hindered settling state. The third feature is the choice of the proportions of the three particulate materials between each other, and according to their respective size ranges, such that the maximum PVF is at least substantially achieved for the sum total of all particulate materials in the fluid system. The step of determining the maximum PVF can further include the step of selecting the particle sizes of the C-S-H seeds and any other additives in order to attain the maximum PVF. The step of determining the maximum PVF and how to select the particle sizes can be found in U.S. Pat. No. 7,213,646 B2 issued to Craig W. Roddy, Ricky L. Covington, and Jiten Chatterji on May 8, 2007, which is hereby incorporated by reference in its entirety for all purposes.

The method embodiments also include the step of allowing the cement composition to set. The step of allowing can be after the step of introducing the cement composition into the subterranean formation. The method embodiments can include the additional steps of perforating, fracturing, or performing an acidizing treatment, after the step of allowing.

The subterranean formation can have a bottomhole temperature in the range of about 35° F. to about 300° F. (about 1.7° C. to about 148.9° C.). Preferably, the subterranean formation has a bottomhole temperature in the range of about 40° F. to about 190° F. (about 4.4° C. to about 87.8° C.). More preferably, the subterranean formation has a bottomhole temperature in the range of about 60° F. to about 120° F. (about 15.6° C. to about 48.9° C.).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables and figures, the concentration of any ingredient in a cement composition can be expressed as, by weight of the cement (abbreviated as "bwc") or gallons per sack of cement (abbreviated as "gal/sk"). The C-S-H seeds were X-SEED® 100, obtained from BASF. The C-S-H seeds were in a slurry form having 20% active solids. All of the concentrations of C-S-H seeds are expressed based on the dry weight of the C-S-H seeds and do not take into account the weight of the continuous phase of the slurry. The dry weight concentrations were calculated based on the 20% activity of the C-S-H seeds in the slurry.

Unless otherwise stated, each of the cement compositions had a density of 16.4 pounds per gallon (lb/gal) (1.97 kg/l) and contained at least the following ingredients: 4.92 gal/sk deionized water; Joppa Class H cement or Dyckerhoff Class G cement; 0.05 gal/sk D-AIR 3000L™ defoaming agent; 0.05% bwc CFR-3™ friction reducer; and 0.05% bwc HR®61, set retarder. Any additional ingredients in the cement composition will be included for each table and listed as "additional ingredients."

Unless stated otherwise, all of the cement compositions were mixed and tested according to the procedure for the specific test as described in The Detailed Description section above. The cement compositions were tested for initial setting time at a variety of temperatures and a pressure of 3,000 psi (21 MPa). The tests for time to reach 500 psi were conducted at a variety of temperatures and a pressure of 3,000 psi (21 MPa). The compressive strength tests were conducted at 24 or 48 hours, a variety of temperatures, and a pressure of 3,000 psi (21 MPa). The thickening time tests were conducted at a variety of temperatures and a pressure of 5,000 psi (34.5 MPa).

Table 1 contains time to reach 500 psi, compressive strength at 24 hours, rate of compressive strength development, and thickening time data for several cement compositions. The cement compositions also contained the following additional ingredients: varying concentrations of C-S-H seeds (% bwc); and either LATEX® 2000 or LATEX® 3000 at a concentration of 1 gal/sk. The cement compositions containing LATEX® 2000, also included 0.2 gal/sk 434B™ latex stabilizer. As can be seen in Table 1, the cement compositions containing either 0.5% or 1% bwc C-S-H seeds, exhibited improved physical properties compared to the cement composition that did not contain C-S-H seeds. The data in Table 1 indicates that, for a given cement composition, as temperature increases, the physical properties of the cement composition are enhanced. For example, as temperature increases, the thickening time decreases, the compressive strength increases, and the rate of strength development increases. As can also be seen in Table 1, the physical properties of a cement composition can be improved with an increase in concentration of C-S-H seeds. The data also shows that C-S-H seeds are not only compatible with two different latex additives, but also improve the physical properties of a cement composition containing the latex additive.

TABLE 1

| Type of Latex | Conc. of C—S—H seeds | Time to 500 psi (hr:min) | | | Compressive Strength (psi) | | | Rate of Strength Development (psi/hr) | | | Thickening Time (hr:min) | | |
|---|---|---|---|---|---|---|---|---|---|---|---|---|---|
| | | 80° F. | 120° F. | 190° F. | 80° F. | 120° F. | 190° F. | 80° F. | 120° F. | 190° F. | 80° F. | 120° F. | 190° F. |
| 2000 | 0   | >40   | 49:28 | 19:52 | 0     | 20    | 1,417 | —     | —     | 280   | >20   | >20   | 5:13 |
| 2000 | 0.5 | 17:28 | 12:20 | 7:00  | 980   | 2,016 | 2,795 | 72    | 273   | 588   | 9:33  | 7:39  | 5:30 |
| 2000 | 1   | 13:16 | 8:22  | 3:54  | 2,145 | 2,485 | 2,472 | 160   | 119   | 602   | 7:15  | 4:44  | 1:54 |
| 3000 | 0   | >30   | >30   | 20:03 | 10.6  | 14.2  | 2,196 | —     | —     | 416.7 | >20   | 18:05 | 8:07 |
| 3000 | 0.5 | 13:50 | 8:43  | 6:53  | 2,165 | 3,416 | 2,772 | 130.5 | 384.7 | 602   | 10:14 | 6:12  | 2:25 |
| 3000 | 1   | 14:42 | 8:07  | 4:22  | 2,141 | 3,193 | 3,109 | 137   | 333.3 | 909   | 7:49  | 3:13  | 1:39 |

Table 2 contains transition time data for several cement compositions. The cement compositions were tested using the SGSA static gel strength procedure at a temperature of 155° F. (68.3° C.) and a pressure of 4,500 psi (31 MPa). The cement compositions also contained the following additional ingredients: varying concentrations of C-S-H seed (1 bwc); and 1 gal/sk of either LATEX® 2000 or LATEX® 3000. As can be seen in Table 2, a cement composition containing a commonly-used latex additive to help control gas migration has a transition time of at least three hours. With the addition of C-S-H seeds, the transition time can be greatly decreased. As can also be seen in Table 2, the transition time can be decreased with an increase in concentration of the C-S-H seeds.

TABLE 2

| Concentration of C-S-H seeds | LATEX ® 2000 Transition Time (hr:min) | LATEX ® 3000 Transition Time (hr:min) |
|---|---|---|
| 0   | 3:27 | 5:47 |
| 0.5 | 1:01 | 0:41 |
| 1   | 0:17 | 0:16 |

Table 3 contains thickening time, initial setting time, time to reach 500 psi, and 24 hour compressive strength data for several cement compositions. The cement compositions had a density of 15.8 ppg (1.9 kg/l) and contained the following ingredients: 4.92 gal/sk deionized water; Dyckerhoff Class G cement; and varying concentrations of C-S-H seeds (1 bwc). As can be seen in Table 3, for a given temperature, as the concentration of C-S-H seeds increases, the thickening time, initial setting time, and time to reach 500 psi is decreased, and the compressive strength is increased. As can also be seen in Table 3, for a given concentration of C-S-H seeds, temperature plays an important role in the physical/mechanical properties of a cement composition. For example, as the temperature increases, the thickening time decreases and compressive strength increases.

TABLE 3

| Conc. of C-S-H seeds | Temp. (° F.) | Thickening Time (hr:min) | Initial Setting Time (hr:min) | Time to 500 psi (hr:min) | Compressive Strength (psi) |
|---|---|---|---|---|---|
| 0.2 | 60 | 4:50 | 6:55 | 15:11 | 1,350 |
| 0.35 | 60 | 3:46 | 6:09 | 13:38 | 1,239 |
| 0.6 | 60 | 2:35 | 5:16 | 11:03 | 1,623 |
| 0.35 | 50 | 6:03 | 8:28 | 17:29 | 1,001 |
| 1.8 | 50 | 2:33 | — | — | — |

Table 4 contains zero gel time and transition time data for two different cement compositions. The tests for the data contained in Table 4 were performed to evaluate the effectiveness of C-S-H seeds in a low density cement composition.

The tests for zero gel time and transition time were performed using the "Mini MACS static gel strength" procedure at a temperature of 60° F. (15.6° C.) and a pressure of 5,000 psi (34.5 MPa) and stirred for 4 hours. Cement composition number 1 had a density of 15.8 ppg (1.9 kg/l) and contained: 4.90 gal/sk deionized water; Dyckerhoff Class G cement; and 0.35% bwc C-S-H seeds. Cement composition number 2 had a density of 12.5 ppg (1.5 kg/l) and contained: 7.10 gal/sk deionized water; Dyckerhoff Class G cement; 3% bwc C-S-H seeds; and 30% bwc SPHERELITE® light-weight additive, available from Halliburton Energy Services, Inc. As can be seen in Table 4, the two cement compositions had comparable zero gel time and transition time. The data in Table 4 indicates that an increase in concentration of C-S-H seeds may be needed as the density of a cement composition is decreased.

TABLE 4

| Cement Composition | Zero Gel Time (hr:min) | Transition Time (hr:min) |
|---|---|---|
| #1 | 4:02 | 0:06 |
| #2 | 4:03 | 0:03 |

The tests for the data listed in Table 5 were conducted to evaluate the effectiveness of C-S-H seeds compared to some commonly-used set accelerators (namely a salt and a thixotropic additive). The cement compositions contained: Dyckerhoff Class G cement; 4.9 gal/sk deionized water for the cement compositions with a density of 15.8 ppg; 7.63 gal/sk deionized water for the cement compositions with a density of 12.5 ppg (1.5 kg/l); varying concentrations of C-S-H seeds; and varying concentrations of calcium chloride ($CaCl_2$) or VersaSet thixotropic additive. Table 5 contains thickening time, initial setting time, time to reach 500 psi, and 24 hour and 48 hour compressive strength data for several cement compositions. As can be seen in Table 5, C-S-H seeds provide comparable or slightly improved properties to a cement composition compared to a cement composition containing $CaCl_2$ or VersaSet. The C-S-H seeds provided a slightly longer thickening time, but a higher 24 hour compressive strength compared to the cement composition containing $CaCl_2$, even though the concentration of C-S-H seeds was much less than the concentration of salt. The cement composition containing C-S-H seeds also exhibited higher 24 and 48 hour compressive strength compared to the cement composition containing VersaSet. As can also be seen in Table 5, the C-S-H seeds can provide improved properties to cement compositions having a density of around 12 ppg and a density of around 16 ppg. This shows the compatibility and usefulness of C-S-H seeds in cement compositions having a wide range of densities.

TABLE 5

| Density (ppg) | C—S—H seeds Conc. (% bwc) | $CaCl_2$ (% bwc) | VersaSet (% bwc) | Thick. Time (hr:min) | Initial Setting Time (hr:min) | Time to 500 psi (hr:min) | 24 hr. Comp. Strength (psi) | 48 hr. Comp. Strength (psi) |
|---|---|---|---|---|---|---|---|---|
| 15.8 | 0.07 | 0 | 0 | 6:03 | 8:28 | 17:29 | 1,001 | 1,863 |
| 15.8 | 0 | 1.8 | 0 | 4:31 | 9:10 | 18:28 | 699 | 1,804 |
| 12.5 | 0.324 | 0 | 0 | 5:25 | 11:19 | 24:02 | 486 | 1,143 |
| 12.5 | 0 | 0 | 1.0 | 2:01 | 8:38 | 31:52 | 342 | 809 |

Figure 1:
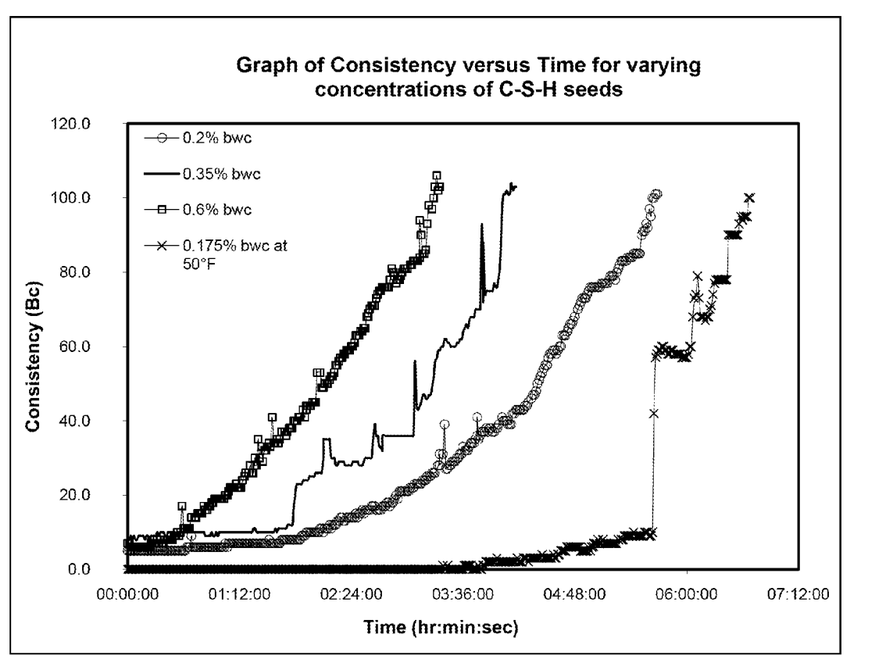
FIG. 1 is a graph of consistency (Bc) versus time (hr:min:sec) showing the thickening time at a temperature of 60° F. (15.6° C.) and a pressure of 5,000 psi (34.5 MPa) for four different cement compositions having a density of 15.8 pounds per gallon (ppg) (1.9 kilograms per liter (kg/l)). The cement compositions contained: Class G cement; deionized (DI) water; 0.05 gallons per sack of cement (gal/sk) D-AIR 3000L™ defoaming agent; and varying concentrations of C-S-H seeds. The C-S-H seeds were X-SEED® 100, obtained from BASF.

FIG. 1 is a graph of consistency (Bc) versus time (hr:min:sec) for four different cement compositions. Consistency testing was performed at a temperature of 60° F. (15.6° C.) for three of the cement compositions and 50° F. (10° C.) for the other cement composition, and a pressure of 5,000 psi (34.5 MPa). Each of the cement compositions had a density of 15.8 ppg and contained deionized water, Class G cement, 0.05 gal/sk D-AIR 3000L™ defoaming agent, and varying concentrations of C-S-H seeds (5 bwc). As can be seen in FIG. 1, the thickening time decreases with an increase in concentration of C-S-H seeds. As can also be seen in FIG. 1, for a given concentration of C-S-H seeds, as the temperature decreases, the thickening time increases.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning, unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
   introducing a cement composition into the subterranean formation, wherein the cement composition comprises:
   cement;
   water; and
   calcium silicate hydrate (C-S-H) seeds,
   wherein a test cement composition consisting essentially of: the cement; the water; and the C-S-H seeds, and in the same proportions as in the cement composition, develops a compressive strength of at least 1,200 psi (8.3 MPa) when tested at 24 hours, a temperature of 60° F. (15.6° C.), and a pressure of 3,000 psi (20.7 MPa); and
   allowing the cement composition to set.

2. The method according to claim 1, wherein the cement comprises at least one hydraulic cement selected from the group consisting of Portland cement, pozzolana cement, gypsum cement, high alumina content cement, slag cement, silica cement, and combinations thereof.

3. The method according to claim 1, wherein the water is selected from the group consisting of freshwater, brackish water, saltwater, and any combination thereof.

4. The method according to claim 1, wherein the C-S-H seeds have a particle size distribution such that at least 90% of the C-S-H seeds have a particle size in the range of 1 micron to 0.1 microns.

5. The method according to claim 1, wherein the C-S-H seeds are in a concentration in the range of about 0.05% to about 7% by weight of the cement.

6. The method according to claim 1, wherein the cement composition further comprises a latex additive.

7. The method according to claim 6, wherein the latex additive is a slurry containing solid rubber particles as the dispersed phase and a liquid as the continuous phase.

8. The method according to claim 7, wherein the rubber particles are selected from the group consisting of: cis-1,4-polyisoprene rubber; styrene-butadiene rubber (SBR), high styrene resin; butyl rubber; ethylene-propylene rubbers (EPM and EPDM); neoprene rubber; nitrile rubber; silicone rubber; chlorosulfonated polyethylene rubber; crosslinked polyethylene rubber; epichlorohydrin rubber; fluorocarbon rubber; fluorosilicone rubber; polyurethane rubber; polyacrylic rubber; polysulfide rubber; AMPS-styrene-butadiene rubber; modified types of any of the foregoing rubbers; and combinations thereof.

9. The method according to claim 1, wherein the cement composition has a thickening time in the range of about 4 to about 15 hours at a temperature of 60° F. (15.6° C.) and a pressure of 5,000 psi (34.5 MPa).

10. The method according to claim 1, wherein the cement composition has an initial setting time of less than 24 hours at a temperature of 60° F. (15.6° C.) and a pressure of 3,000 psi (20.7 MPa).

11. The method according to claim 1, wherein the cement composition has a setting time of less than 48 hours at a temperature of 60° F. (15.6° C).

12. The method according to claim 1, wherein the cement composition has a compressive strength in the range of about 1,000 to about 5,000 psi (about 3.5 to about 34.5 MPa) when tested at 24 hours, a temperature of 60° F. (15.6° C), and a pressure of 3,000 psi (20.7 MPa).

13. The method according to claim 1, wherein the cement composition has a transition time of less than 1 hour, using the SGSA static gel strength procedure at a temperature of 155° F. (68.3° C) and a pressure of 4,500 psi (31 MPa).

14. The method according to claim 1, wherein the cement composition has a transition time of less than 50 minutes, using the Mini MACS static gel strength procedure at a temperature of 60° F. (15.6° C.) and a pressure of 5,000 psi (34.5 MPa).

15. The method according to claim 1, wherein the cement composition further includes at least one additive.

16. The method according to claim 15, wherein the at least one additive is selected from the group consisting of a filler, a fluid loss additive, a set retarder, a friction reducer, a strength-retrogression additive, a light-weight additive, a defoaming agent, a high-density additive, a mechanical property enhancing additive, a lost-circulation material, a filtration-control additive, a thixotropic additive, and combinations thereof.

17. The method according to claim 1, wherein the subterranean formation has a bottomhole temperature in the range of about 60° F. to about 120° F. (about 15.6° C. to about 48.9° C).

18. The method according to claim 1, further comprising the step of determining the maximum Packing Volume Fraction prior to the step of introducing.

19. A method of cementing in a subterranean formation comprising:
   introducing a cement composition into the subterranean formation, wherein the cement composition comprises:
   cement;
   water; and
   calcium silicate hydrate (C-S-H) seeds, wherein the C-S-H seeds are in at least a sufficient concentration such that the cement composition develops a compressive strength of at least 1,200 psi (8.3 MPa) when tested at 24 hours, a temperature of 60° F. (15.6° C), and a pressure of 3,000 psi (20.7 MPa), whereas a substantially identical cement composition without the C-S-H seeds, develops a compressive strength of less than 1,200 psi (8.3 MPa) when tested at 24 hours, a temperature of 60° F. (15.6° C.), and a pressure of 3,000 psi (20.7 MPa); and
   allowing the cement composition to set.

20. A method of cementing in a subterranean formation comprising:
   introducing a cement composition into the subterranean formation, wherein the cement composition comprises:
   cement;
   water; and
   calcium silicate hydrate (C-S-H) seeds, wherein the C-S-H seeds are mesoscopic particles, nanoparticles, or combinations thereof, and wherein the C-S-H seeds are in a concentration in the range of about 1% to about 5% by weight of the cement; and
   allowing the cement composition to set.

* * * * *